(12) United States Patent
Booth et al.

(10) Patent No.: US 7,297,265 B1
(45) Date of Patent: Nov. 20, 2007

(54) BACKWASH STRAINER HAVING A CYCLONIC FLOW MECHANISM

(75) Inventors: Walter A. Booth, Barnegat, NJ (US); Vincent A. Amarosa, Ringwood, NJ (US); Alan R. Levin, Advance, NC (US)

(73) Assignee: Eaton Corporation, Cleveland, OH (US)

( * ) Notice: Subject to any disclaimer, the term of this patent is extended or adjusted under 35 U.S.C. 154(b) by 0 days.

(21) Appl. No.: 11/479,137

(22) Filed: Jun. 30, 2006

(51) Int. Cl.
*B01D 35/22* (2006.01)

(52) U.S. Cl. .................... 210/304; 210/305; 210/411; 210/415

(58) Field of Classification Search ................ 210/304, 210/306, 414, 415, 305, 411
See application file for complete search history.

(56) References Cited

U.S. PATENT DOCUMENTS

| | | | |
|---|---|---|---|
| 3,129,171 A * | 4/1964 | Rosaen | 210/108 |
| 3,508,383 A | 4/1970 | Humbert, Jr. et al. | |
| 4,060,483 A * | 11/1977 | Barzuza | 210/741 |
| 4,315,820 A * | 2/1982 | Mann et al. | 210/408 |
| 4,328,103 A | 5/1982 | Kraeling, Jr. et al. | |
| 4,657,671 A | 4/1987 | Botstiber et al. | |
| 4,818,402 A * | 4/1989 | Steiner et al. | 210/411 |
| 5,539,790 A | 7/1996 | Henriksson | |
| 5,587,074 A * | 12/1996 | Lynch et al. | 210/411 |
| 5,879,545 A | 3/1999 | Antoun | |
| 6,468,421 B2 | 10/2002 | Huckestein | |
| 6,540,914 B1 | 4/2003 | Smith | |
| 6,719,900 B2 | 4/2004 | Hawkins | |
| 6,752,920 B2 | 6/2004 | Harris et al. | |

FOREIGN PATENT DOCUMENTS

| | | | |
|---|---|---|---|
| DE | 605103 | * | 10/1934 |
| JP | 60-183017 A | * | 2/1984 |

OTHER PUBLICATIONS

"Hayward's Complete Guide To Standard Cast Pipeline Strainers," pp. 1-57, Hayward Industrial Products, Inc., Jan. 2002.
"Hayward's Complete Guide To Fabricated and Automatic Self Cleaning Pipeline Strainers," pp. 1-37, Hayward Industrial Products, Inc., Feb. 2002.
"Hayward's Complete Guide To Wright-Austin Gas/Liquid Separators," pp. 1-32, Hayward Industrial Products, Inc., Dec. 2002.

* cited by examiner

*Primary Examiner*—Thomas M. Lithgow
(74) *Attorney, Agent, or Firm*—Greenberg Traurig, LLP

(57) ABSTRACT

A backwash strainer is equipped with a mechanism for enhancing performance of a backwash operation by imparting a cyclonic flow to liquid to be filtered. The backwash strainer includes a generally cylindrical filter element that defines an interior chamber having an inlet through which liquid to be filtered can flow. A backwash arm is rotatably mounted within the interior chamber of the filter element. An impeller ring is positioned proximal the inlet for imparting cyclonic flow to a liquid flowing therethrough.

19 Claims, 6 Drawing Sheets

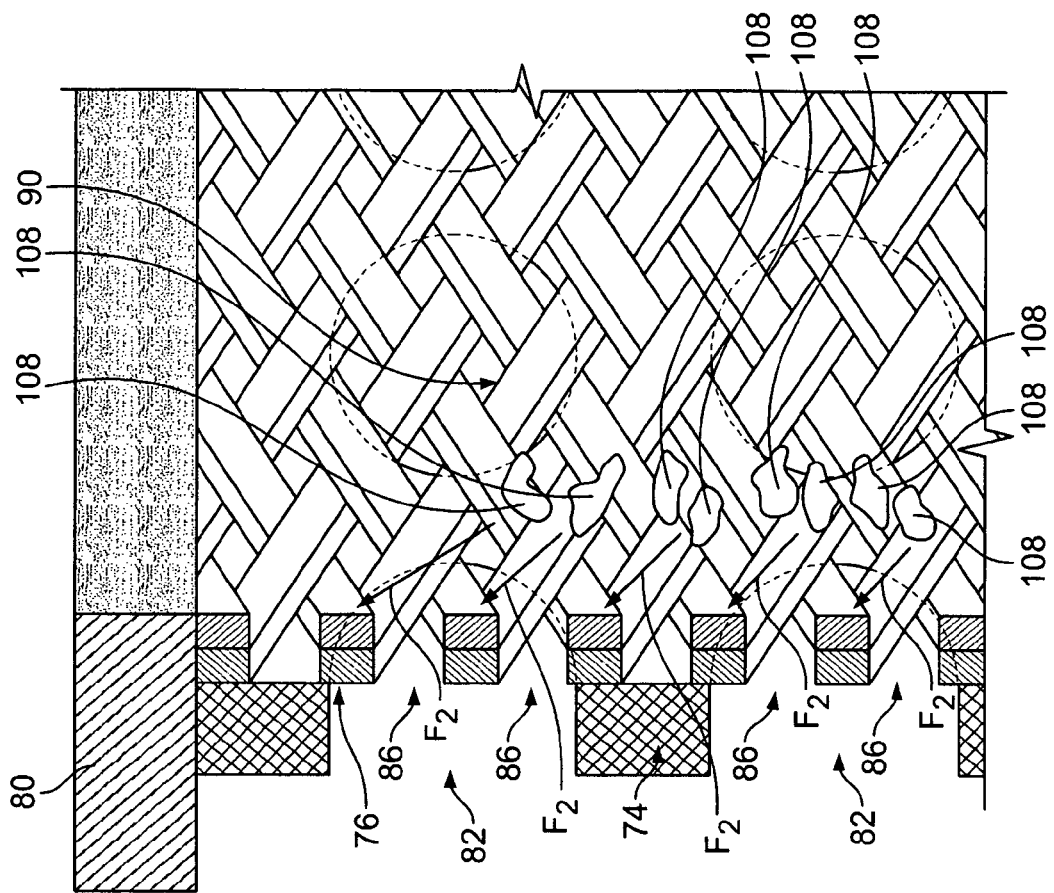
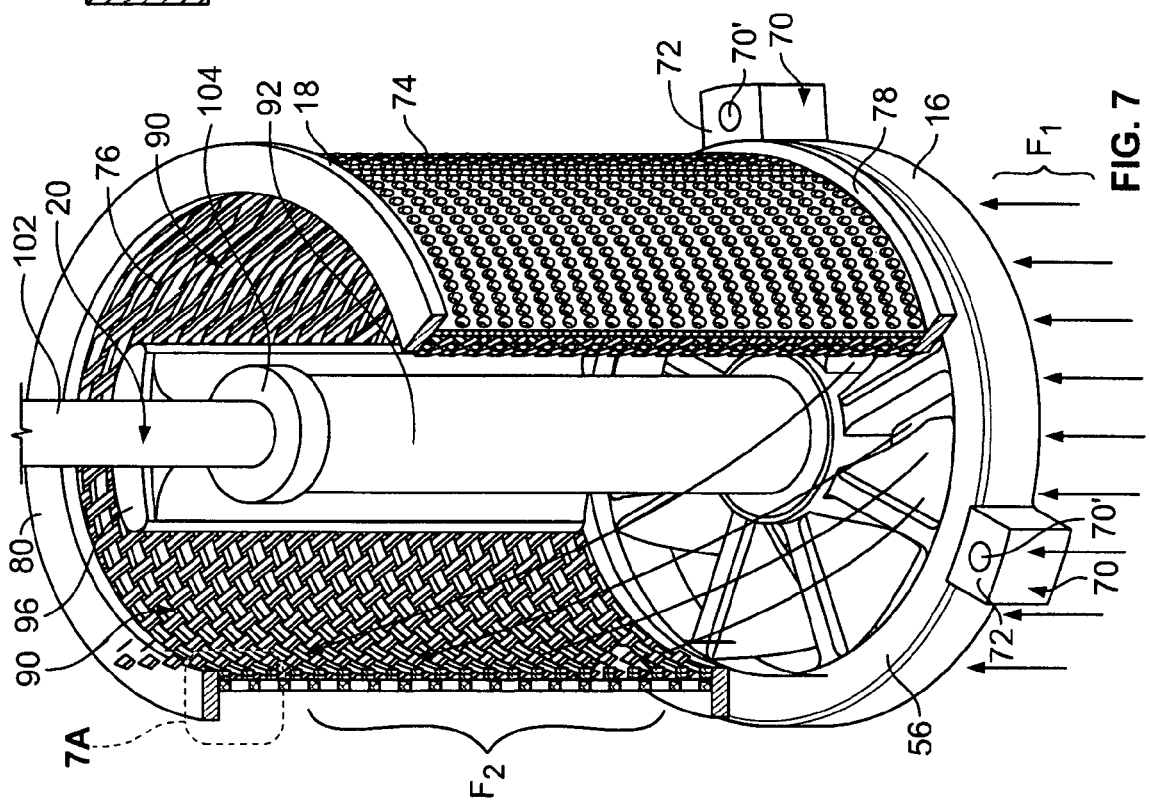

BACKWASH STRAINER HAVING A CYCLONIC FLOW MECHANISM

FIELD OF THE INVENTION

The present invention relates to a backwash strainer for filtering debris particles from a liquid.

BACKGROUND OF THE INVENTION

Backwash strainers are well known in the art. For example, U.S. Pat. No. 4,328,103 to Kraeling, Jr. et al. (the "Kraeling '103 patent") discloses such a strainer for filtering particulate debris from a liquid. The strainer includes a hollow body which houses a filtering element in the form of a cylindrical screen. A rotatable backwash arm is positioned within the cylindrical screen.

During a filtering operation, liquid with debris flows into the strainer through an inlet. After flowing upwardly into the interior of the cylindrical screen, the debris-laden liquid flows radially outward through openings in the screen. At least some of the debris collects on an inner surface of the screen. The filtered liquid exits the strainer through an outlet.

Over time, the screen becomes clogged with the collected debris, thereby necessitating the performance of a backwash operation to clear the screen. During the performance of such a backwashing operation, the backwash arm is rotated to continuously isolate portions of the screen and, through the creation of a pressure differential, causes a reverse flow of liquid so as to force the collected debris into the backwash arm for discharge from the strainer.

Although backwash strainers such as the one disclosed in the Kraeling '103 patent have been commercially successful, it is always desirable to reduce clogging of the screen, because such clogging has a detrimental affect on the overall efficiency of the strainer. More particularly, as the frequency and duration of clogging increases, the frequency and duration at which the backwash operation must be performed increases, thereby reducing the total volume of liquid filtered by the strainer over time. What is needed therefore is a backwash strainer having means for inhibiting clogging so to maximize strainer efficiency.

SUMMARY OF THE INVENTION

Preferred embodiments of the present invention provide a mechanism for enhancing performance of a backwash operation by imparting a cyclonic flow to liquid with debris particles to be filtered. More particularly, a backwash strainer is provided with a generally cylindrical filter element that defines an inlet through which liquid to be filtered can flow. A backwash arm is rotatably mounted within the interior chamber of the filter element, and means, such as an impeller ring, is positioned proximal the inlet for imparting cyclonic flow to the liquid flowing therethrough.

The impeller ring includes a rim abutting an end of the filter element which defines the inlet to the filter element. A hub is provided in the impeller ring to define a central open area that receives a shaft of the backwash arm. A plurality of vanes extend between the rim and the hub and in a direction away from the filter element. The impeller ring includes alignment means, such as a plurality of shoulders, for aligning the filter element with the impeller ring such that they are coaxially aligned.

BRIEF DESCRIPTION OF THE DRAWINGS

For a more complete understanding of the present invention, reference is made to the following detailed description of an exemplary embodiment thereof considered in conjunction with the accompanying drawings, in which:

FIG. 7 is a perspective view of a filter element assembly employed by the backwash strainer shown in FIGS. 1 and 2, a section of the filter element assembly being broken away to facilitate consideration and discussion; and FIG. 7A is an enlarged view of a portion of the filter element assembly shown in FIG. 7.

DETAILED DESCRIPTION OF THE EXEMPLARY EMBODIMENT

Figure 1:
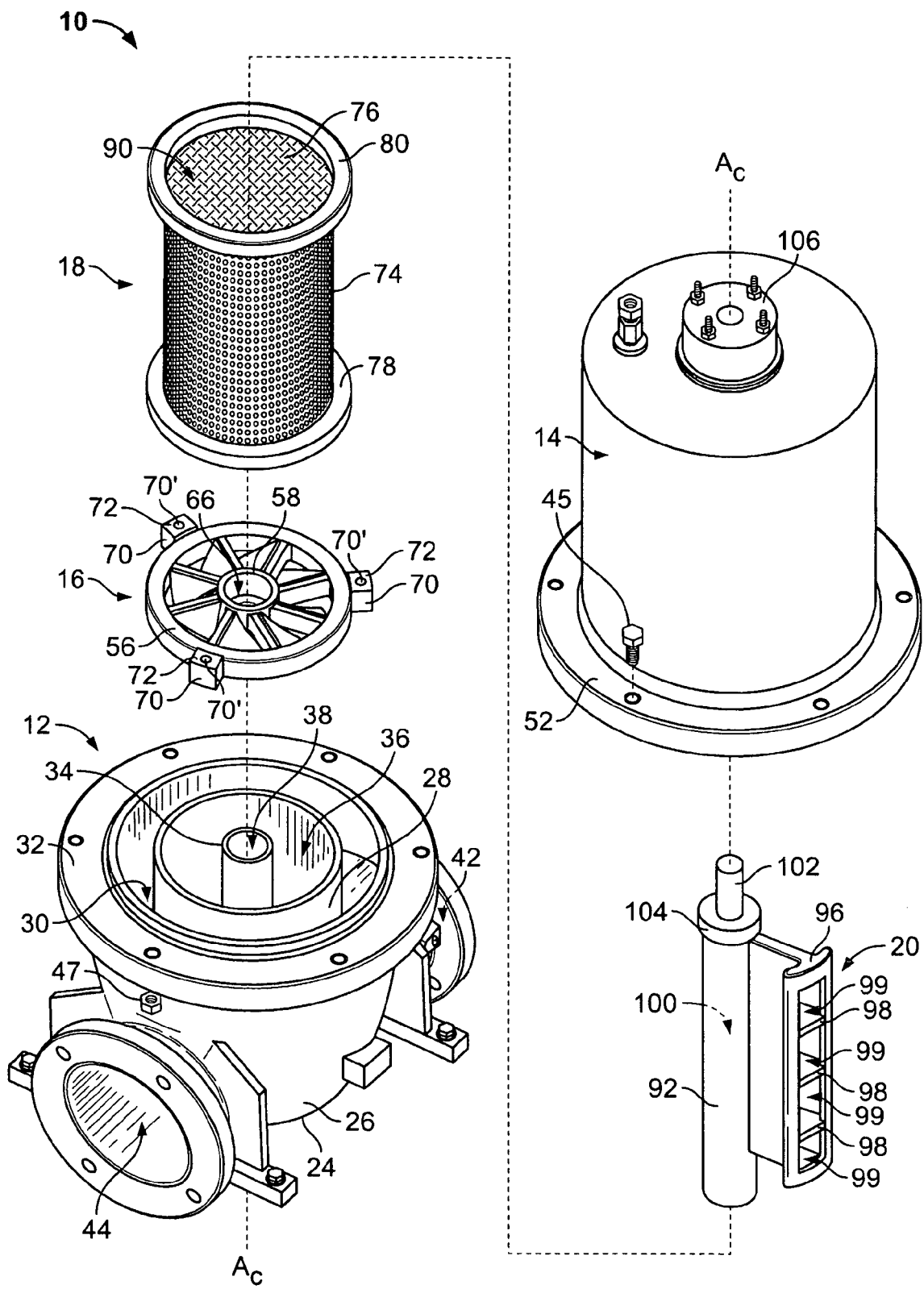
FIG. 1 is an exploded view of a backwash strainer equipped with a cyclonic flow mechanism in accordance with the present invention.
Figure 2:
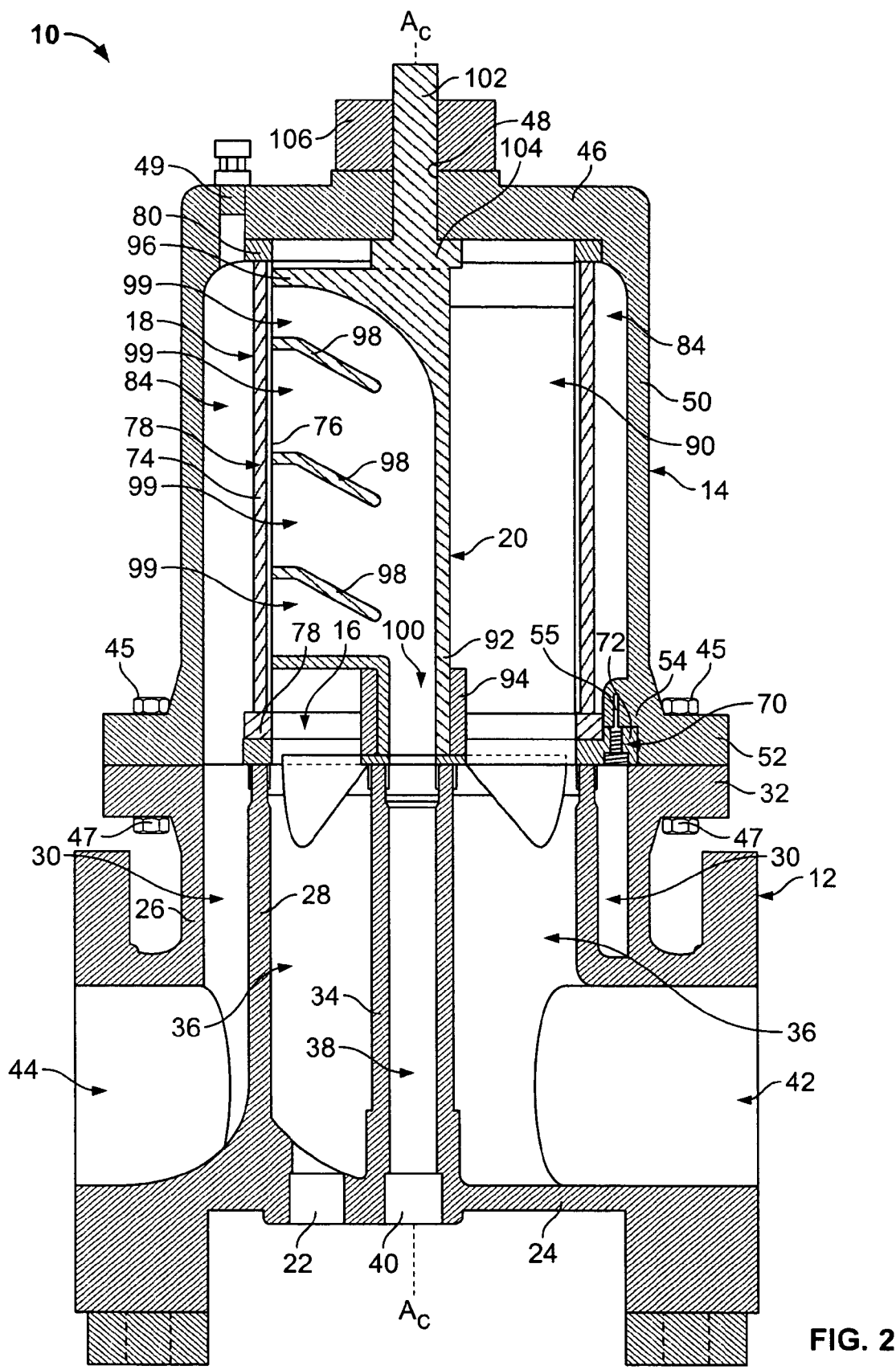
FIG. 2 is a cross-sectional view of the backwash strainer of FIG. 1, the cross section being taken through a vertical plane which includes a central longitudinal axis $A_C$ of the backwash strainer.
Figure 3:
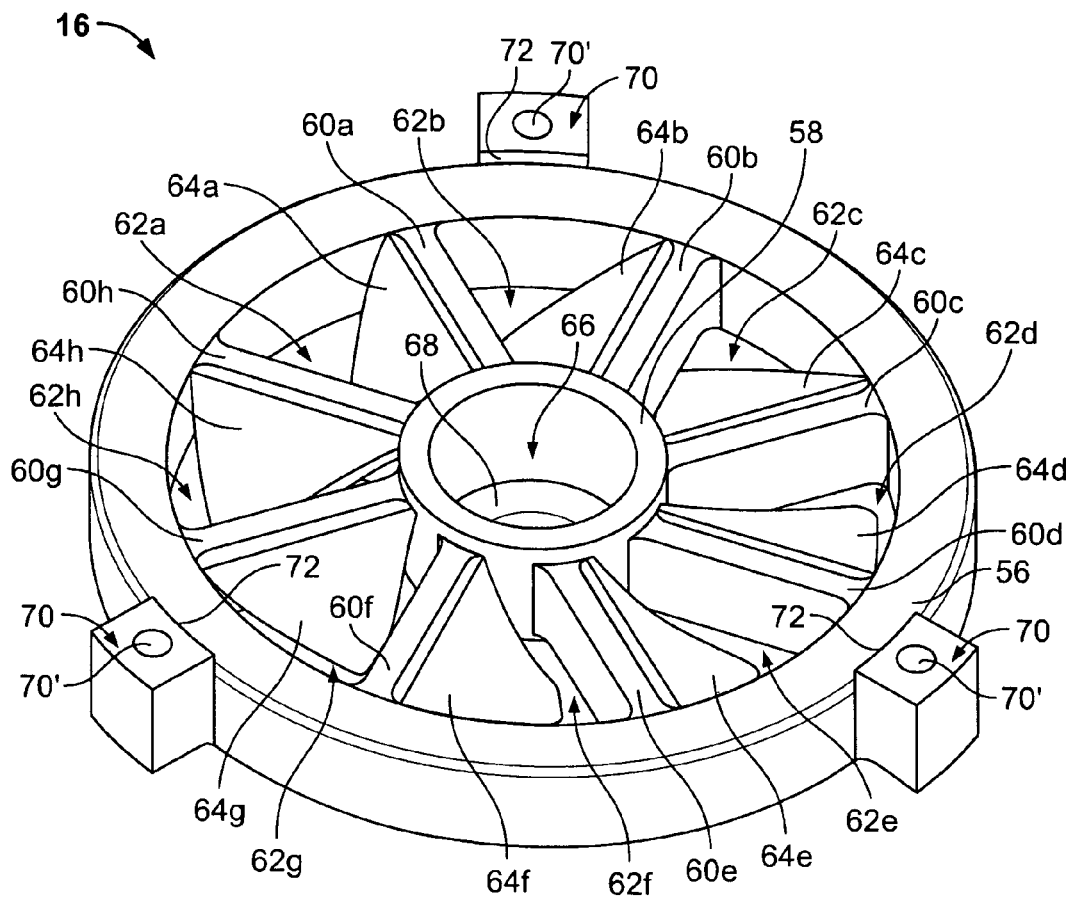
FIG. 3 is a top perspective view of an impeller ring which is employed by the backwash strainer shown in FIGS. 1 and 2.
Figure 4:
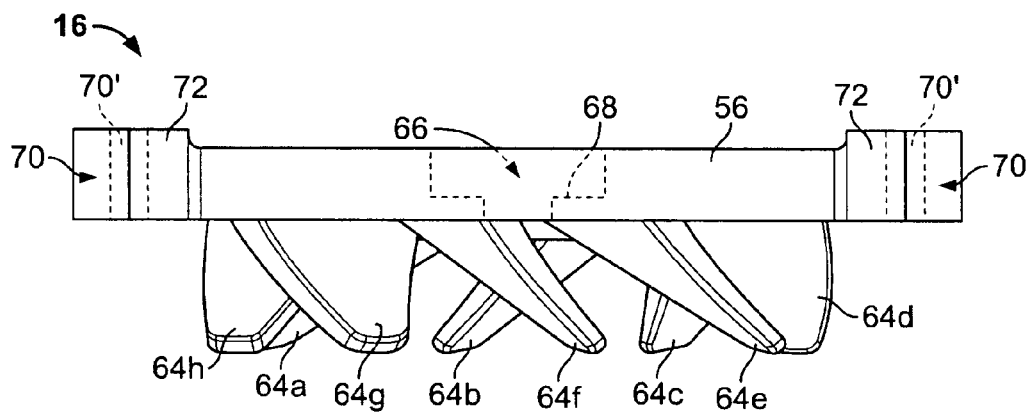
FIG. 4 is a side elevational view of the impeller ring of FIG. 3.
Figure 5:
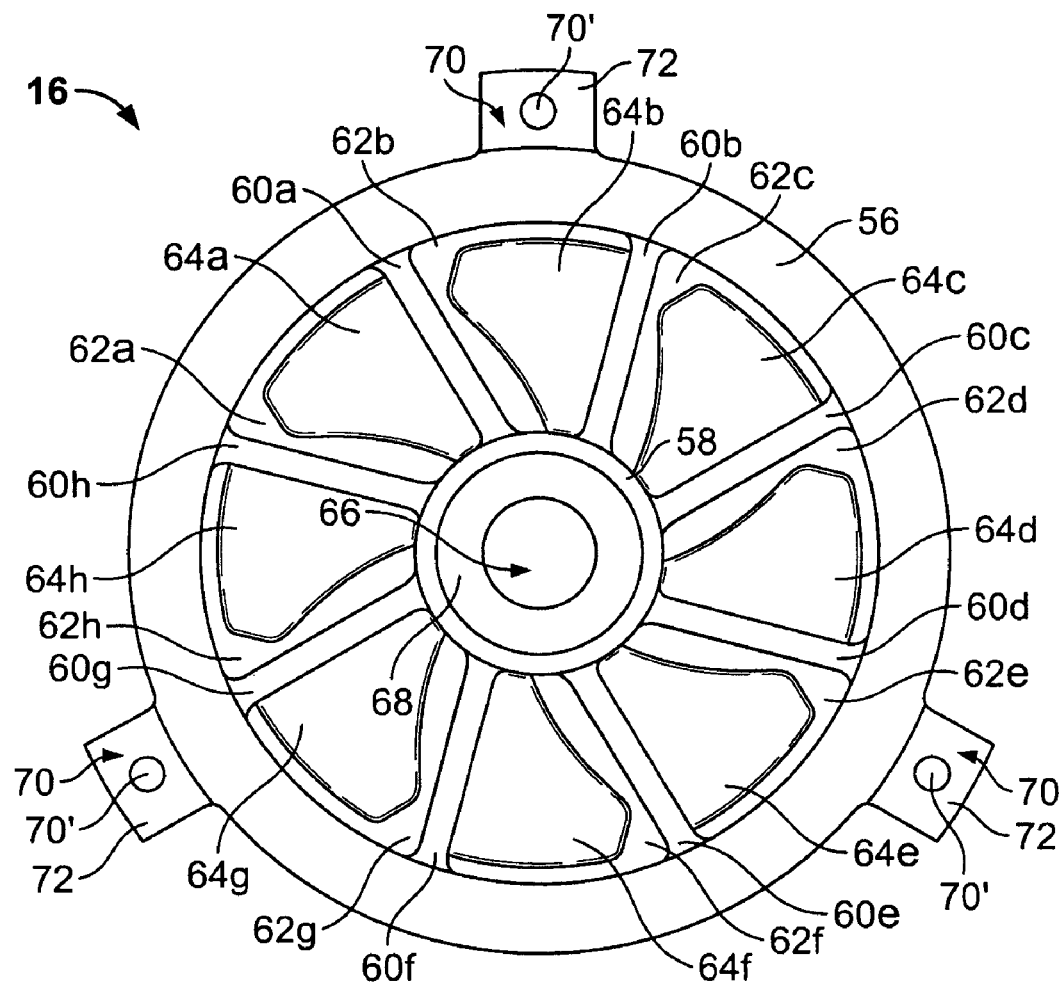
FIG. 5 is a top plan view of the impeller ring of FIG. 3.
Figure 6:
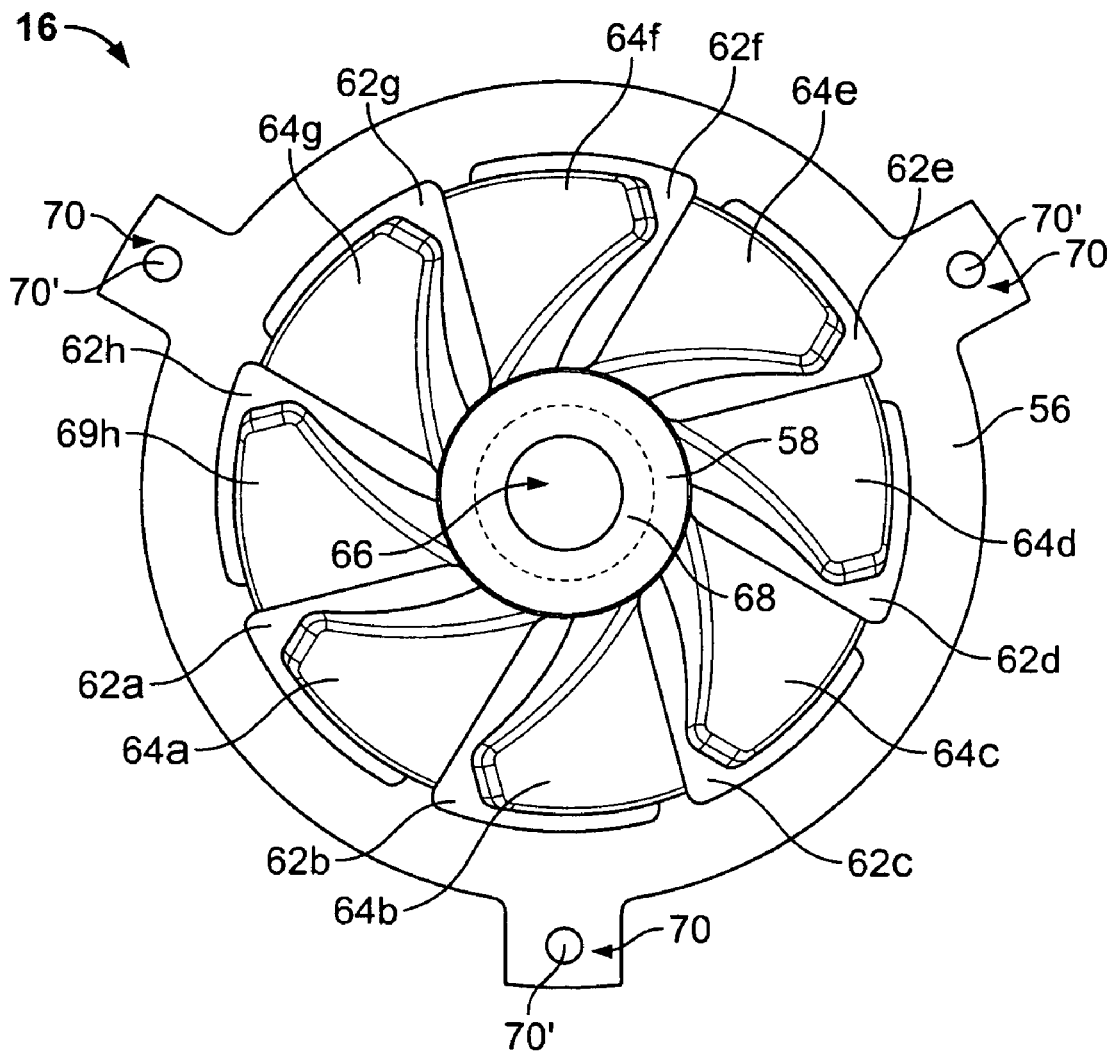
FIG. 6 is a bottom plan view of the impeller ring of FIG. 3.

Referring to FIGS. 1 and 2, a backwash strainer 10 includes the following basic elements: a housing base 12, a housing bonnet 14, an impeller ring 16, a filter element assembly 18, and a backwash arm 20, all of which are aligned along a central longitudinal axis $A_C$. Each of these elements shall be described in greater detail below.

With continued reference to FIGS. 1 and 2, the base 12 is secured to the bonnet 14 to form a two-piece housing that encapsulates the impeller ring 16, the filter element assembly 18, and the backwash arm 20. The base 12, which is preferably formed from a corrosion-resistant metal and/or alloy, includes an end wall 24 having a manual drain 22. A cylindrical outer wall 26 extends from the end wall 24, and a cylindrical partition 28 is concentric with the outer wall 26. A generally annular chamber, referenced herein as an outflow chamber 30, is formed between the outer wall 26 and the partition 28. An annular flange 32 extends radially outward from an open end of the base 12. The annular flange 32 has a plurality of holes (not designated), each of which is adapted to receive a bolt 45 (only one of which is shown in FIG. 1) for securing the flange 32 to the bonnet 14.

The base 12 further includes a cylindrical drain pipe 34 that is concentric with the partition 28 and the outer wall 26. A generally annular chamber, referenced herein as an inflow chamber 36, is formed between the drain pipe 34 and the partition 28. A passageway 38 extends through the drain pipe 34 to a backwash drain 40 formed in the end wall 24.

An inlet 42 and an outlet 44 are provided on opposite sides of the base 12. The inlet 42 extends from the outer wall 26 to the inflow chamber 36 so as to allow liquid to flow into the inflow chamber 36 from an external source (e.g., from a body of water to be filtered). The outlet 44 extends from the outflow chamber 30 to the outer wall 26 so as to allow filtered liquid to flow from the backwash strainer 10.

Referring still to FIG. 2, the bonnet 14 includes an end wall 46 opposite the end wall 24 of the base 12. The end wall 46 has a central opening 48 and a pressure relief vent 49. The bonnet 14 includes a cylindrical side wall 50 that extends from the end wall 46 so as to be axially aligned with the outer wall 26 of the base 12. The interior of the bonnet 14 houses the filter element assembly 18, the backwash arm 20, and at least a portion of the impeller ring 16.

An annular flange 52 extends radially outward from an open end of the bonnet 14. The annular flange 52 has a plurality of holes (not designated) adapted for alignment with the holes formed in the annular flange 32 of the base 12. Bolts 45 extend through the aligned holes and cooperate with nuts 47 to attach the flanges 32 and 52 in an abutting and liquid tight manner. For the purpose of clarity, FIG. 1 shows one of the bolts 45 and one of the nuts 47, and FIG. 2 shows two of the bolts 45 and two of the nuts 47.

The bonnet 14 further includes a plurality of tabs 54 (only one of which is shown in FIG. 2) extending radially inward from the side wall 50. Each one of the tabs 54 has a threaded bore (not designated) for receiving a fastener 55, which, as further discussed below, facilitates the attachment of the impeller ring 16 to the bonnet 14. Although not limiting the scope of the present invention, the exemplary embodiment of the present invention includes three tabs 54, each one being angularly displaced from its adjacent tabs 54 by about one hundred and twenty degrees.

Referring to FIGS. 2-6, the impeller ring 16, which is formed from a rigid, corrosion-resistant metal and/or alloy, has an outer rim 56 that abuts the partition 28 of the base 12 and an inner hub 58 that abuts the drain pipe 34 of the base 12. A gasket (not designated) forms a seal between the rim 56 and the partition 28, and another gasket (not designated) forms a seal between the hub 58 and the drain pipe 34.

A plurality of spokes 60a-h extend radially between the rim 56 and the hub 58. Openings 62a-h are formed between the spokes 60a-h by a plurality of curved vanes 64a-h, each of which depends at an angle from a corresponding one of the spokes 60a-h. The vanes 64a-h extend through the openings 62a-h and into the inflow chamber 36.

The hub 58 of the impeller ring 16 defines a central open area 66 that is aligned with the central longitudinal axis $A_C$ and the passageway 38. An annular lip, referenced herein as a seat 68, extends radially inward from the hub 58 at a side of the impeller ring 16 proximal the drain pipe 34.

The impeller ring 16 also has a plurality of flanges 70 spaced apart about the rim 56 and extending radially outward therefrom. Each of the flanges 70 has a hole 70' sized and dimensioned so as to receive a corresponding fastener 55 (only one of which is shown in FIG. 2). The fasteners 55 are threadedly received in the tabs 54 to secure the impeller ring 16 to the bonnet 14. Shoulders 72 are formed where the flanges 70 merge with the rim 56 of the impeller ring 16. The shoulders 72 function as an alignment means for properly positioning the filter element assembly 18 relative to the central longitudinal axis $A_C$.

With reference to FIGS. 2, 7 and 7A, the filter element assembly 18 includes an outer filter 74 and an inner filter 76. One end 78 of the filter element assembly 18 abuts the rim 56 of the impeller ring 16 to define an inlet through which fluid to be filtered may flow. An opposite end 80 of the filter element assembly 18 abuts the end wall 46 of the bonnet 14.

The outer filter 74 is preferably a cylindrical wall provided with a plurality of apertures 82 (see FIG. 7A). The outer filter 74 cooperates with the walls 46, 50 of the bonnet 14 to define an annular chamber, which is referenced herein as an outflow chamber 84.

The inner filter 76 is positioned within the outer filter 74 and between the annular ends 78, 80 of the filter element assembly 18. The inner filter 76 is formed from a woven layer provided with a plurality of apertures 86 (see FIG. 7A). The inner filter 76, the impeller ring 16, and the end wall 46 cooperate to define a chamber within the filter element assembly 18, which is referenced herein as a cyclonic flow chamber 90, and which has an inlet defined by end 78 of the filter element assembly 18 proximal the impeller ring 16.

The quantity of inner apertures 86 is greater than the quantity of outer apertures 82. Furthermore, the size (e.g., volume) of each one of the inner apertures 86 is less than the size (e.g., volume) of each one of the outer apertures 82. The larger size of the outer apertures 82 imparts structural integrity to the outer filter 74 and the filter assembly 18 generally. At the same time, the smaller size of the inner apertures 86 provides enhanced filtering. The inner filter 76 is removable and relatively inexpensive to replace.

The filter element assembly 18 shown in FIGS. 2, 7 and 7A is one of many types of filters contemplated for use in connection with the present invention. Any suitable filter and/or strainer known in the art can be used. Moreover, it should be understood that the apertures of such filter(s) and/or strainer(s) can comprise cut-outs, pores, and/or any other type of opening adapted to permit the flow of liquid therethrough.

Referring again to FIG. 2, the backwash arm 20 is positioned within the cyclonic flow chamber 90. The backwash arm 20 includes a shaft 92 that is hollow and that extends into the central open area 66 of the impeller ring 16. A cylindrical gasket 94 forms a loose seal between the shaft 92 and the hub 58 of the impeller ring 16. The backwash arm 20 has a face or shoe 96 which extends from the shaft 92 toward the inner filter 76. The shoe 96 is generally hollow, but has a plurality of vanes 98 extending between the sidewalls (not designated) of the shoe 96. The vanes 98 form a plurality of backwash chambers 99 with the sidewalls of the shoe 96. The backwash chambers 99 are in liquid communication with a backwash passageway 100, which extends through the shaft 92 to the drain pipe 34.

The backwash arm 20 also includes a drive shaft 102 and a bearing plate 104 which is positioned adjacent the end wall 46 of the bonnet 14. A washer (not shown) can be provided between the bearing plate 104 and the end wall 46. The backwash arm 20 extends from the bearing plate 104 through and out of the central opening 48 of the end wall 46 of the bonnet 14. A coupling 106 is mounted on the bonnet 14 to receive the drive shaft 102 and maintain the alignment thereof along the central longitudinal axis $A_C$. A motor (not shown) or other drive means for rotating the drive shaft 102 is in mechanical communication therewith. The drive shaft 102 is rotatable in response to actuation of the drive means so as to impart rotary motion to the backwash arm 20. The drive means is provided with user-selectable controls, such as controls for actuating the drive means, controls for selecting the angular velocity of drive shaft 102, etc.

Referring to FIG. 2, the backwash strainer 10 includes an electro-mechanical system (not shown) for sensing and manipulating the pressure within the various chambers of the base 12 and the bonnet 14. For example, a first pressure sensor (not shown) is positioned within the outlet 44 to continuously measure a first pressure value $P_1$, while a second pressure sensor (not shown) is positioned within the inlet 42 to continuously measure a second pressure value $P_2$. An electronic processor communicates with the first pressure sensor, the second pressure sensor, and a valve (not shown) positioned at the backwash drain 40. The valve is operable between an open position in which the passageway 38 is exposed to atmospheric pressure $P_o$, and a closed position, in which the passageway 38 is unexposed to the atmospheric pressure $P_o$.

The electronic processor is operable to open and close the valve in accordance with any one or more sets of logic. As a first example, the electronic processor is operable to open the valve at predetermined time intervals (e.g., for five minutes every one hour). As a second example, the electronic processor is operable to open the valve in response to manual actuation by an operator of the backwash strainer 10. As a third example, the electronic processor continuously calculates a pressure differential $\Delta P_{P2-P1}$, opens the valve when the pressure differential $\Delta P_{P2-P1}$ exceeds a predetermined value $P_C$, and closes the valve when the pressure differential $\Delta P_{P2-P1}$ drops below the predetermined value $P_C$.

Referring to FIGS. 1, 7, and 7A, a contemplated use of the backwash strainer 10 and exemplary operation thereof shall now be described in further detail. During a filtering operation, debris-laden liquid is delivered to the inlet 42, as the pressure value $P_2$ at the inlet 42 is continuously measured. The liquid then flows into the inflow chamber 36, where the liquid flows in a generally linear direction $F_1$ (see FIG. 7) toward the impeller ring 16.

Continuing with reference to FIGS. 7 and 7A, as the liquid flows through the openings 62a-h of the impeller ring 16 into the cyclonic flow chamber 90, the impeller ring 16 functions to impart a cyclonic flow $F_2$ to the liquid so as to direct the liquid through the apertures 82, 86 and deposit debris particles 108 against the inner filter 76 within the chamber 90. The cyclonic flow $F_2$ is at least partially helical.

The cyclonic flow $F_2$ enhances the probability that the debris particles 108 will approach the apertures 86 at an angle, thereby reducing the probability that the apertures 86 will become clogged by the debris particles 108. The cyclonic flow $F_2$ also reduces anomalies in the even distribution of the debris particles 108 across the inner filter 74. By minimizing clogging and/or facilitating a less anomalous distribution of debris during the filtering operation, the backwash operation can be more efficiently performed, thereby enhancing the efficiency of the backwash strainer 10.

During the filtering operation (as well as the backwash operation), the backwash arm 20 continuously rotates. Although it is contemplated that the backwash arm 20 can rotate intermittently, it is preferable that the backwash arm 20 continuously rotate so as to acquire momentum. Such momentum enables the shoe 96 to more easily rotate along the inner filter 76 despite the accumulation of the debris particles 108 during the filtering operation.

After flowing through the filter element assembly 18, the filtered liquid flows into the outflow chamber 84 formed in the bonnet 14 and then into the outflow chamber 30 formed in the base 12. The filtered liquid thereafter flows from the outflow chamber 30 into the outlet 44, where the pressure $P_1$ is continuously measured. The filtered liquid finally exits the backwash strainer 10 from the outlet 44.

The aforementioned electronic processor identifies when the filter element assembly 18 has become clogged to such a degree that initiation of the backwash operation is desirable. In this regard, the electronic processor continuously calculates the pressure differential $\Delta P_{P2-P1}$ and continuously compares the pressure differential $\Delta P_{P2-P1}$ to the predetermined value $P_C$ to identify when an unacceptably high level of clogging is present. If the pressure differential $\Delta P_{P2-P1}$ has exceeded the predetermined value $P_C$, the electronic processor initiates a backwash operation by actuating the valve at the backwash drain 40 into an open position, thereby introducing atmospheric pressure $P_o$ into the drain pipe 34 and the backwash arm 20.

During the backwash operation, the pressure in the outflow chamber 84 is greater than the atmospheric pressure $P_o$ introduced into the backwash arm 20. Thus, as the backwash arm 20 rotates, a reverse flow of liquid occurs from the outflow chamber 84 into the shoe 96 of the backwash arm 20, whereby the collected debris particles 108 are washed off of the filter element assembly 18 and into the backwash chambers 99 for discharge from the strainer 10. Because the apertures 86 are smaller than the apertures 82, the fluid accelerates as it passes through the filter assembly 18.

The vanes 98 of the shoe 96 facilitate a more even, e.g., less anomalous, distribution of the atmospheric pressure $P_o$ across the portion of the filter element assembly 18 isolated by the shoe 96, thereby facilitating more even backwashing of the debris particles 108. The backwash operation continues until the pressure differential $\Delta P_{P2-P1}$ has dropped below the predetermined value $P_C$, at which time the electronic processor closes the valve at the backwash drain 40.

It will be understood that the embodiment of the present invention described herein is merely exemplary and that a person skilled in the art may make many variations and modifications without departing from the spirit and the scope of the present invention. All such variations and modifications, including those discussed above, are intended to be included within the scope of the present invention as defined in the appended claims.

What is claimed is:

1. A backwash strainer, comprising a generally cylindrical filter element that defines an interior chamber having an inlet through which liquid to be filtered can flow; a backwash arm rotatably mounted within said interior chamber of said filter element; and cyclonic flow means positioned proximal said inlet for imparting cyclonic flow to liquid flowing therethrough, said cyclonic flow means including a plurality of fixed vanes, each of which extends in a generally radial direction relative to an axis which is substantially coincident with a longitudinal axis of said filter element.

2. The backwash strainer of claim 1, wherein said cyclonic flow means includes an impeller ring extending circumferentially about said vanes.

3. The backwash strainer of claim 2, wherein said impeller ring includes a rim abutting an end of said filter element which defines said inlet.

4. The backwash strainer of claim 3, wherein said impeller ring is arranged so as to be below said filter element.

5. The backwash strainer of claim 4, wherein each adjacent pair of vanes defines an opening adapted to permit fluid flow therethrough.

6. The backwash strainer of claim 4, wherein said impeller ring includes alignment means for aligning said filter element with said impeller ring such that they are coaxially aligned.

7. The backwash strainer of claim 6, wherein said impeller ring includes a hub defining a central open area that receives a shaft of said backwash arm.

8. The backwash strainer of claim 7, wherein said vanes extend between said rim and said hub, each adjacent pair of vanes defining an opening adapted to permit fluid flow therethrough.

9. The backwash strainer of claim 1, further comprising a housing for said filter element, said cyclonic flow means being fixedly attached to said housing.

10. The backwash strainer of claim 1, wherein said backwash arm has a hollow area for receiving a reverse flow of fluid through said filter element, said hollow area being subdivided into a plurality of chambers.

11. The backwash strainer of claim 1, wherein said filter element includes an inner filter member having apertures of a first size and an outer filter member having apertures of a second size greater than said first size.

12. The backwash strainer of claim 11, wherein said backwash arm has a hollow area for receiving a reverse flow of fluid through said filter element.

13. The backwash strainer of claim 12, wherein said backwash arm is positioned in close proximity to said inner filter member.

14. The backwash strainer of claim 13, wherein said cyclonic flow means includes a rim abutting an end of said filter element which defines said inlet.

15. The backwash strainer of claim 14, wherein said cyclonic flow means is arranged so as to be below said filter element.

16. The backwash strainer of claim 15, wherein said cyclonic flow means includes alignment means for aligning said filter element with said cyclonic flow means such that they are coaxially aligned.

17. The backwash strainer of claim 16, wherein said cyclonic flow means includes a hub defining a central open area that receives a shaft of said backwash arm.

18. The backwash strainer of claim 17, wherein said vanes extend between said rim and said hub, each adjacent pair of vanes defining an opening adapted to permit fluid flow therethrough.

19. The backwash strainer of claim 9, wherein said cyclonic flow means includes a rim, which abuts an end of said filter element defining said inlet.

* * * * *